United States Patent
Xu et al.

(10) Patent No.: US 10,187,881 B2
(45) Date of Patent: Jan. 22, 2019

(54) UPLINK POWER CONTROL METHOD AND APPARATUS

(71) Applicant: Huawei Technologies Co., Ltd., Shenzhen (CN)

(72) Inventors: Zhan Xu, Shanghai (CN); Bo Liu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 176 days.

(21) Appl. No.: 15/135,136

(22) Filed: Apr. 21, 2016

(65) Prior Publication Data

US 2016/0242155 A1 Aug. 18, 2016

Related U.S. Application Data

(63) Continuation of application No. PCT/CN2013/085868, filed on Oct. 24, 2013.

(51) Int. Cl.
*H04W 4/00* (2018.01)
*H04W 72/04* (2009.01)
(Continued)

(52) U.S. Cl.
CPC ......... *H04W 72/042* (2013.01); *H04W 24/08* (2013.01); *H04W 52/50* (2013.01);
(Continued)

(58) Field of Classification Search
CPC .................................................. H04W 52/50
(Continued)

(56) References Cited

U.S. PATENT DOCUMENTS 7,986,959 B2 * 7/2011 Malladi ................. H04W 52/08
455/522
8,977,313 B2 * 3/2015 Chao ................... H04W 52/146
455/522
(Continued)

FOREIGN PATENT DOCUMENTS

CN 102036326 A 4/2011
EP 2200382 A2 6/2010
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331 V11.5.0, Sep. 2013, 347 pages.
(Continued)

Primary Examiner — Guang W Li
(74) Attorney, Agent, or Firm — Slater Matsil, LLP (57) ABSTRACT

An uplink power control method and apparatus are provided. The method is performed by a base station and includes: determining, according to a first quantity of accesses and a second quantity of accesses, whether to adjust a cell-level uplink power parameter, where the first quantity of accesses is a count of times that UEs access a cell of the base station by sending a random access preamble for one time, and the second quantity of accesses is a count of times that the UEs access the cell by sending a random access preamble for at least two times; and adjusting, when determining to adjust the cell-level uplink power parameter, the cell-level uplink power parameter, and sending an adjusted parameter to UE within the coverage area of the cell, so that the UE sends an uplink signal according to the adjusted cell-level uplink power parameter, thereby saving a measurement resource.

6 Claims, 4 Drawing Sheets

(51) Int. Cl.
   *H04W 52/50* (2009.01)
   *H04W 24/08* (2009.01)
   *H04W 52/14* (2009.01)
   *H04W 52/22* (2009.01)
   *H04W 52/24* (2009.01)
   *H04W 74/00* (2009.01)

(52) U.S. Cl.
   CPC ........ *H04W 52/146* (2013.01); *H04W 52/225* (2013.01); *H04W 52/241* (2013.01); *H04W 52/242* (2013.01); *H04W 72/0473* (2013.01); *H04W 74/00* (2013.01)

(58) Field of Classification Search
   USPC .......................................................... 370/329
   See application file for complete search history.

(56) References Cited

U.S. PATENT DOCUMENTS

| | | | | |
|---|---|---|---|---|
| 9,084,204 | B2* | 7/2015 | Lu | H04W 52/242 |
| 9,538,477 | B2* | 1/2017 | Li | H04W 52/146 |
| 9,544,111 | B2* | 1/2017 | Noh | H04L 5/0048 |
| 2004/0203981 | A1* | 10/2004 | Budka | H04W 52/265 |
| | | | | 455/522 |
| 2008/0268893 | A1* | 10/2008 | Lee | H04W 52/146 |
| | | | | 455/522 |
| 2009/0298528 | A1 | 12/2009 | Cave et al. | |
| 2010/0254292 | A1* | 10/2010 | Kim | H04W 52/146 |
| | | | | 370/311 |
| 2011/0165874 | A1* | 7/2011 | Amirijoo | H04W 74/0866 |
| | | | | 455/434 |
| 2012/0282889 | A1* | 11/2012 | Tanaka | H04J 11/0053 |
| | | | | 455/405 |
| 2013/0039195 | A1* | 2/2013 | Weng | H04W 48/20 |
| | | | | 370/252 |
| 2013/0250875 | A1* | 9/2013 | Chen | H04W 52/365 |
| | | | | 370/329 |
| 2015/0016312 | A1* | 1/2015 | Li | H04W 74/0833 |
| | | | | 370/280 |
| 2015/0023281 | A1* | 1/2015 | Wu | H04W 52/146 |
| | | | | 370/329 |
| 2016/0081033 | A1* | 3/2016 | Ouchi | H04W 52/146 |
| | | | | 455/522 |
| 2016/0242214 | A1 | 8/2016 | Kuroda | |

FOREIGN PATENT DOCUMENTS

| | | |
|---|---|---|
| JP | 2005532711 A | 10/2005 |
| JP | 2009296464 A | 12/2009 |
| JP | 2013201631 A | 10/2013 |
| WO | 2007052753 A1 | 5/2007 |
| WO | 2010124453 A1 | 11/2010 |
| WO | 2013124881 A1 | 8/2013 |
| WO | 2013142040 A1 | 9/2013 |

OTHER PUBLICATIONS

"Uplink Data Channel Interference Mitigation via Power Control," Source: CATT, Agenda Item: 6.8.4, Document for: Discussion and Decision, 3GPP TSG RAN WG1 Meeting #62, R1-104350, Aug. 23-27, 2010, 8 pages.

* cited by examiner

UPLINK POWER CONTROL METHOD AND APPARATUS

This application is a continuation of International Application No. PCT/CN2013/085868, filed on Oct. 24, 2013, which is hereby incorporated by reference in its entirety.

TECHNICAL FIELD

Embodiments of the present invention relate to communications technologies, and in particular, to an uplink power control method and apparatus.

BACKGROUND

A Long Term Evolution (LTE) system has an uplink power control function, which aims to reduce interference in an entire network and improve a system capacity on condition that service quality of a service is ensured.

In the prior art, an evolved NodeB (eNodeB) continuously measures signal transmission power of user equipment (UE), compares the signal transmission power with preset target power, and generates and issues a power control command to the UE, so that the UE controls the signal transmission power after receiving the power control command issued by the eNodeB, and a difference between the measured signal transmission power and the target power is reduced. For example, if the measured signal transmission power is greater than the target power, the eNodeB issues a power control command enabling the UE to lower the signal transmission power. However, the method relies on a large amount of measured data, and consumes a measurement resource. In addition, a power configuration parameter can be optimized only after statistical analysis is performed on data that is measured within a period of time.

SUMMARY

Embodiments of the present invention provide an uplink power control method and apparatus, to resolve a resource waste problem in the prior art caused by continuous measurement of signal transmission power of UE.

According to a first aspect, an embodiment of the present invention provides an uplink power control method, including:

determining, by a base station according to a first quantity of accesses and a second quantity of accesses, whether to adjust a cell-level uplink power parameter, where the first quantity of accesses is a count of times that user equipments (UEs) within a coverage area of a cell of the base station access the cell by sending a random access preamble for one time, and the second quantity of accesses is a count of times that the UEs within the coverage area of the cell access the cell by sending a random access preamble for at least two times; and if determining to adjust the cell-level uplink power parameter, adjusting, by the base station, the cell-level uplink power parameter, and sending an adjusted cell-level uplink power parameter to UE within the coverage area of the cell, so that the UE within the coverage area of the cell sends an uplink signal according to the adjusted cell-level uplink power parameter.

In a first possible implementation manner of the first aspect, the determining, by a base station according to a first quantity of accesses and a second quantity of accesses, whether to adjust a cell-level uplink power parameter includes:

determining, by the base station according to a ratio between the first quantity of accesses and the second quantity of accesses, whether to adjust the cell-level uplink power parameter.

According to the first possible implementation manner of the first aspect, in a second possible implementation manner, the determining, by the base station according to a ratio between the first quantity of accesses and the second quantity of accesses, whether to adjust the cell-level uplink power parameter includes:

calculating, by the base station, the ratio x according to the first quantity a of accesses and the second quantity b of accesses, where $$y = \frac{b}{a+b};$$

if the ratio x is greater than or equal to a preset first threshold, determining, by the base station, to adjust the cell-level uplink power parameter; and the adjusting, by the base station, the cell-level uplink power parameter includes:

decreasing, by the base station, a value of the cell-level uplink power parameter.

According to the second possible implementation manner of the first aspect, in a third possible implementation manner, the decreasing, by the base station, a value of the cell-level uplink power parameter includes:

decreasing, by the base station, the value of the cell-level uplink power parameter by a preset first adjustment step.

According to the first possible implementation manner of the first aspect, in a fourth possible implementation manner, the determining, by the base station according to a ratio between the first quantity of accesses and the second quantity of accesses, whether to adjust the cell-level uplink power parameter includes:

calculating, by the base station, the ratio y according to the first quantity a of accesses and the second quantity b of accesses, where $$y = \frac{b}{a+b};$$

if the ratio y is greater than or equal to a preset second threshold, determining, by the base station, to adjust the cell-level uplink power parameter; and the adjusting, by the base station, the cell-level uplink power parameter includes:

increasing, by the base station, a value of the cell-level uplink power parameter.

According to the fourth possible implementation manner of the first aspect, in a fifth possible implementation manner, the increasing, by the base station, a value of the cell-level uplink power parameter includes:

increasing, by the base station, the value of the cell-level uplink power parameter by a preset second adjustment step.

According to a second aspect, an embodiment of the present invention provides an uplink power control method, including:

receiving, by user equipment (UE) within a coverage area of a cell, a cell-level uplink power parameter sent by a base station, where the cell-level uplink power parameter is an adjusted cell-level uplink power parameter that is sent to the UE within the coverage area of the cell when the base station determines to adjust a cell-level uplink power parameter, where the base station determines, according to a first quantity of accesses and a second quantity of accesses, whether to adjust the cell-level uplink power parameter, the first quantity of accesses is a count of times that the UEs within the coverage area of the cell access the cell by sending a random access preamble for one time, and the second quantity of accesses is a count of times that the UEs within the coverage area of the cell access the cell by sending a random access preamble for at least two times; and sending, by the UE, an uplink signal according to a value of the received adjusted cell-level uplink power parameter.

In a first possible implementation manner of the second aspect, the sending, by the UE, an uplink signal according to a value of the received adjusted cell-level uplink power parameter includes:

using, by the UE, the value of the received adjusted cell-level uplink power parameter as power for sending the uplink signal, and sending the uplink signal at the power.

According to a third aspect, an embodiment of the present invention provides an uplink power control method, including:

determining, by a base station according to first power and a total quantity of times that user equipment (UE) sends a random access preamble before accessing a cell, whether to adjust a UE-level uplink power parameter, where the first power is power at which the UE sends a random access preamble for a first time before accessing the cell of the base station; and if determining to adjust the UE-level uplink power parameter, adjusting, by the base station, the UE-level uplink power parameter, and sending an adjusted UE-level uplink power parameter to the UE, so that the UE sends an uplink signal according to the adjusted UE-level uplink power parameter.

In a first possible implementation manner of the third aspect, the determining, by a base station according to first power and a total quantity of times that user equipment (UE) sends a random access preamble before accessing a cell, whether to adjust a UE-level uplink power parameter includes:

calculating, by the base station, second power $P_1$ according to the first power $P_0$ and the total quantity of times n that the UE sends the random access preamble before accessing the cell, where $P_1=P_0+(n-1)\times S$, S is a preset adjustment step, and the second power $P_1$ is power at which the UE sends a random access preamble for a last time before accessing the cell; and determining, by the base station according to the second power $P_1$, whether to adjust the UE-level uplink power parameter.

According to the first possible implementation manner of the third aspect, in a second possible implementation manner, the determining, by the base station according to the second power $P_1$, whether to adjust the UE-level uplink power parameter includes:

if the second power $P_1$ is not equal to a cell-level uplink power parameter $P_{cell}$, determining, by the base station, to adjust the UE-level uplink power parameter; and the adjusting, by the base station, the UE-level uplink power parameter includes:

adjusting, by the base station, a value $P_{ue}$ of the UE-level uplink power parameter to $P_{ue}'$, where $P_{ue}'=P_1-P_{cell}$.

According to a fourth aspect, an embodiment of the present invention provides an uplink power control method, including:

receiving, by user equipment (UE), a UE-level uplink power parameter sent by a base station, where the UE-level uplink power parameter is an adjusted UE-level uplink power parameter that is sent to the UE when the base station determines to adjust a UE-level uplink power parameter, where the base station determines, according to first power and a total quantity of times that the UE sends a random access preamble before accessing a cell of the base station, whether to adjust the UE-level power parameter, and the first power is power at which the UE sends a random access preamble for a first time before accessing the cell; and sending, by the UE, an uplink signal according to a value of the received adjusted UE-level uplink power parameter.

In a first possible implementation manner of the fourth aspect, the sending, by the UE, an uplink signal according to a value of the received adjusted UE-level uplink power parameter includes:

using, by the UE, a sum of the value of the received adjusted UE-level uplink power parameter and a value of a received cell-level uplink power parameter, as power for sending the uplink signal, and sending the uplink signal at the power.

According to a fifth aspect, an embodiment of the present invention provides an uplink power control apparatus, including:

a power parameter adjustment determining module, configured to determine, according to a first quantity of accesses and a second quantity of accesses, whether a cell-level uplink power parameter is to be adjusted, where the first quantity of accesses is a count of times that user equipments (UEs) within a coverage area of a cell of the base station access the cell by sending a random access preamble for one time, and the second quantity of accesses is a count of times that the UEs within the coverage area of the cell access the cell by sending a random access preamble for at least two times; and a power parameter adjustment module, configured to: if it is determined to adjust the cell-level uplink power parameter, adjust the cell-level uplink power parameter, and send an adjusted cell-level uplink power parameter to UE within the coverage area of the cell, so that the UE within the coverage area of the cell sends an uplink signal according to the adjusted cell-level uplink power parameter.

In a first possible implementation manner of the fifth aspect, the power parameter adjustment determining module is specifically configured to determine, according to a ratio between the first quantity of accesses and the second quantity of accesses, whether the cell-level uplink power parameter is to be adjusted.

According to the first possible implementation manner of the fifth aspect, in a second possible implementation manner, the power parameter adjustment determining module is specifically configured to: calculate the ratio x according to the first quantity a of accesses and the second quantity b of accesses, where $$x = \frac{a}{a+b},$$

and if the ratio x is greater than or equal to a preset first threshold, determine that the cell-level uplink power parameter is to be adjusted; and the power parameter adjustment module is specifically configured to decrease a value of the cell-level uplink power parameter.

According to the second possible implementation manner of the fifth aspect, in a third possible implementation manner, the power parameter adjustment module is specifically configured to decrease the value of the cell-level uplink power parameter by a preset first adjustment step.

According to the first possible implementation manner of the fifth aspect, in a fourth possible implementation manner, the power parameter adjustment determining module is specifically configured to: calculate the ratio y according to the first quantity a of accesses and the second quantity b of accesses, where $$y = \frac{b}{a+b},$$

and if the ratio y is greater than or equal to a preset second threshold, determine that the cell-level uplink power parameter is to be adjusted; and the power parameter adjustment module is specifically configured to increase a value of the cell-level uplink power parameter.

According to the fourth possible implementation manner of the fifth aspect, in a fifth possible implementation manner, the power parameter adjustment module is specifically configured to increase the value of the cell-level uplink power parameter by a preset second adjustment step.

According to a sixth aspect, an embodiment of the present invention provides an uplink power control apparatus, including:

a power parameter receiving module, configured to receive a cell-level uplink power parameter sent by a base station, where the cell-level uplink power parameter is an adjusted cell-level uplink power parameter that is sent to UE within a coverage area of a cell when the base station determines to adjust a cell-level uplink power parameter, where the base station determines, according to a first quantity of accesses and a second quantity of accesses, whether to adjust the cell-level uplink power parameter, the first quantity of accesses is a count of times that UEs within the coverage area of the cell of the base station access the cell by sending a random access preamble for one time, and the second quantity of accesses is a count of times that the UEs within the coverage area of the cell access the cell by sending a random access preamble for at least two times; and an uplink signal sending module, configured to send an uplink signal according to a value of the received adjusted cell-level uplink power parameter.

In a first possible implementation manner of the sixth aspect, the uplink signal sending module is specifically configured to: use the value of the received adjusted cell-level uplink power parameter as power for sending the uplink signal, and send the uplink signal at the power.

According to a seventh aspect, an embodiment of the present invention provides an uplink power control apparatus, including:

a power parameter adjustment determining module, configured to determine, according to first power and a total quantity of times that user equipment (UE) sends a random access preamble before accessing a cell, whether a UE-level uplink power parameter is to be adjusted, where the first power is power at which the UE sends a random access preamble for a first time before accessing the cell of the base station; and a power parameter adjustment module, configured to: if it is determined to adjust the UE-level uplink power parameter, adjust the UE-level uplink power parameter, and send an adjusted UE-level uplink power parameter to the UE, so that the UE sends an uplink signal according to the adjusted UE-level uplink power parameter.

In a first possible implementation manner of the seventh aspect, the power parameter adjustment determining module is specifically configured to: calculate second power $P_1$ according to the first power $P_0$ and the total quantity of times n that the UE sends the random access preamble before accessing the cell, where $P_1 = P_0 + (n-1) \times S$, S is a preset adjustment step, and the second power $P_1$ is power at which the UE sends a random access preamble for a last time before accessing the cell; and determine, according to the second power $P_1$, whether the UE-level uplink power parameter is to be adjusted.

According to the first possible implementation manner of the seventh aspect, in a second possible implementation manner, the power parameter adjustment determining module is specifically configured to: if the second power $P_1$ is not equal to a cell-level uplink power parameter $P_{cell}$, determine that the UE-level uplink power parameter is to be adjusted; and the power parameter adjustment module is specifically configured to adjust a value $P_{ue}$ of the UE-level uplink power parameter to $P_{ue}'$, where $P_{ue}' = P_1 - P_{cell}$.

According to an eighth aspect, an embodiment of the present invention provides an uplink power control apparatus, including:

a power parameter receiving module, configured to receive a UE-level uplink power parameter sent by a base station, where the UE-level uplink power parameter is an adjusted UE-level uplink power parameter that is sent to the UE when the base station determines to adjust a UE-level uplink power parameter, where the base station determines, according to first power and a total quantity of times that user equipment (UE) sends a random access preamble before accessing a cell of the base station, whether to adjust the UE-level power parameter, and the first power is power at which the UE sends a random access preamble for a first time before accessing the cell; and an uplink signal sending module, configured to send an uplink signal according to a value of the received adjusted UE-level uplink power parameter.

In a first possible implementation manner of the eighth aspect, the uplink signal sending module is specifically configured to: use a sum of the value of the received adjusted UE-level uplink power parameter and a value of a received cell-level uplink power parameter, as power for sending the uplink signal, and send the uplink signal at the power.

According to a ninth aspect, an embodiment of the present invention provides an uplink power control apparatus, including a processor and a transmitter, where the processor is configured to determine, according to a first quantity of accesses and a second quantity of accesses, whether a cell-level uplink power parameter is to be adjusted, where the first quantity of accesses is a count of times that user equipments (UEs) within a coverage area of a cell of the base station access the cell by sending a random access preamble for one time, and the second quantity of accesses is a count of times that the UEs within the coverage area of the cell access the cell by sending a random access preamble for at least two times; and the transmitter is configured to: if it is determined to adjust the cell-level uplink power parameter, adjust the cell-level uplink power parameter, and send an adjusted cell-level uplink power parameter to UE within the coverage area of the cell, so that the UE within the coverage area of the cell sends an uplink signal according to the adjusted cell-level uplink power parameter.

In a first possible implementation manner of the ninth aspect, the processor is specifically configured to determine, according to a ratio between the first quantity of accesses and the second quantity of accesses, whether the cell-level uplink power parameter is to be adjusted.

According to the first possible implementation manner of the ninth aspect, in a second possible implementation manner, the processor is specifically configured to: calculate the ratio x according to the first quantity a of accesses and the second quantity b of accesses, where $$x = \frac{a}{a+b}$$

and if the ratio x is greater than or equal to a preset first threshold, determine that the cell-level uplink power parameter is to be adjusted; and the transmitter is specifically configured to decrease a value of the cell-level uplink power parameter.

According to the second possible implementation manner of the ninth aspect, in a third possible implementation manner, the transmitter is specifically configured to decrease the value of the cell-level uplink power parameter by a preset first adjustment step.

According to the first possible implementation manner of the ninth aspect, in a fourth possible implementation manner, the processor is specifically configured to: calculate the ratio y according to the first quantity a of accesses and the second quantity b of accesses, where $$y = \frac{b}{a+b}$$

and if the ratio y is greater than or equal to a preset second threshold, determine that the cell-level uplink power parameter is to be adjusted; and the transmitter is specifically configured to increase a value of the cell-level uplink power parameter.

According to the fourth possible implementation manner of the ninth aspect, in a fifth possible implementation manner, the transmitter is specifically configured to increase the value of the cell-level uplink power parameter by a preset second adjustment step.

According to a tenth aspect, an embodiment of the present invention provides an uplink power control apparatus, including a receiver and a transmitter, where the receiver is configured to receive a cell-level uplink power parameter sent by a base station, where the cell-level uplink power parameter is an adjusted cell-level uplink power parameter that is sent to UE within a coverage area of a cell when the base station determines to adjust a cell-level uplink power parameter, where the base station determines, according to a first quantity of accesses and a second quantity of accesses, whether to adjust the cell-level uplink power parameter, the first quantity of accesses is a count of times that UEs within the coverage area of the cell of the base station access the cell by sending a random access preamble for one time, and the second quantity of accesses is a count of times that the UEs within the coverage area of the cell access the cell by sending a random access preamble for at least two times; and the transmitter is configured to send an uplink signal according to a value of the received adjusted cell-level uplink power parameter.

In a first possible implementation manner of the tenth aspect, the transmitter is specifically configured to: use the value of the received adjusted cell-level uplink power parameter as power for sending the uplink signal, and send the uplink signal at the power.

According to an eleventh aspect, an embodiment of the present invention provides an uplink power control apparatus, including a processor and a transmitter, where the processor is configured to determine, according to first power and a total quantity of times that user equipment (UE) sends a random access preamble before accessing a cell, whether a UE-level uplink power parameter is to be adjusted, where the first power is power at which the UE sends a random access preamble for a first time before accessing the cell of the base station; and the transmitter is configured to: if it is determined to adjust the UE-level uplink power parameter, adjust the UE-level uplink power parameter, and send an adjusted UE-level uplink power parameter to the UE, so that the UE sends an uplink signal according to the adjusted UE-level uplink power parameter.

In a first possible implementation manner of the eleventh aspect, the processor is specifically configured to: calculate second power $P_1$ according to the first power $P_0$ and the total quantity of times n that the UE sends the random access preamble before accessing the cell, where $P_1=P_0+(n-1)\times S$, S is a preset adjustment step, and the second power $P_1$ is power at which the UE sends a random access preamble for a last time before accessing the cell; and determine, according to the second power $P_1$, whether the UE-level uplink power parameter is to be adjusted.

According to the first possible implementation manner of the eleventh aspect, in a second possible implementation manner, the processor is specifically configured to: if the second power $P_1$ is not equal to a cell-level uplink power parameter $P_{cell}$, determine that the UE-level uplink power parameter is to be adjusted; and the transmitter is specifically configured to adjust a value $P_{ue}$ of the UE-level uplink power parameter to $P_{ue}'$, where $P_{ue}'=P_1-P_{cell}$.

According to a twelfth aspect, an embodiment of the present invention provides an uplink power control apparatus, including a receiver and a transmitter, where the receiver is configured to receive a UE-level uplink power parameter sent by a base station, where the UE-level uplink power parameter is an adjusted UE-level uplink power parameter that is sent to UE when the base station determines to adjust a UE-level uplink power parameter, where the base station determines, according to first power and a total quantity of times that the user equipment (UE) sends a random access preamble before accessing a cell of the base station, whether to adjust the UE-level power parameter, and the first power is power at which the UE sends a random access preamble for a first time before accessing the cell; and the transmitter is configured to send an uplink signal according to the received adjusted UE-level uplink power parameter.

In a first possible implementation manner of the twelfth aspect, the transmitter is specifically configured to: use a sum of a value of the received adjusted UE-level uplink power parameter and a value of a received cell-level uplink power parameter, as power for sending the uplink signal, and send the uplink signal at the power.

According to the uplink power control method and apparatus in the embodiments of the present invention, it is determined, according to a first quantity of accesses and a second quantity of accesses, whether to adjust a cell-level uplink power parameter; if it is determined to adjust the cell-level uplink power parameter, the cell-level uplink power parameter is adjusted, and an adjusted cell-level uplink power parameter is sent to UE within a coverage area of a cell, so that the UE within the coverage area of the cell sends an uplink signal according to the adjusted cell-level uplink power parameter. Therefore, a resource waste problem in the prior art caused by continuously measuring signal transmission power of UE to adjust a cell-level uplink power parameter is resolved, thereby saving a measurement resource.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
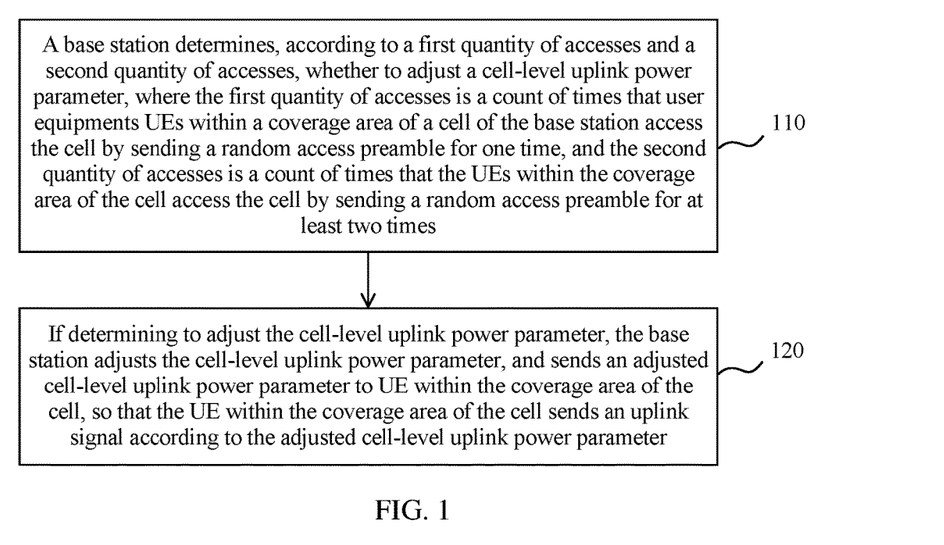
FIG. 1 is a flowchart of an uplink power control method according to Embodiment 1 of the present invention.

FIG. 1 is a flowchart of an uplink power control method according to Embodiment 1 of the present invention. The method in this embodiment is applicable to a case in which uplink power control is performed on UE within a coverage area of a cell. The method is executed by an uplink power control apparatus, and the apparatus is generally implemented in a manner of hardware and/or software. The method in this embodiment includes the following steps:

110. A base station determines, according to a first quantity of accesses and a second quantity of accesses, whether to adjust a cell-level uplink power parameter, where the first quantity of accesses is a count of times that user equipments (UEs) within a coverage area of a cell of the base station access the cell by sending a random access preamble for one time, and the second quantity of accesses is a count of times that the UEs within the coverage area of the cell access the cell by sending a random access preamble for at least two times.

Because in the prior art, uplink power control relies on a large amount of measured data, a relatively large quantity of measurement resources are consumed. However, after the UEs within the coverage area of the cell access the cell, the first quantity of accesses and the second quantity of accesses in step 110 can be counted by the base station according to quantities of times, reported by the UEs, that the UEs send the random access preamble before accessing the cell. Therefore, the base station does not need to continuously measure power at which UE transmits an uplink signal, and a measurement resource is saved. In step 110 in this embodiment, the base station determines, according to the first quantity of accesses and the second quantity of accesses, whether to adjust the cell-level uplink power parameter, so as to determine whether to proceed to step 120.

120. If determining to adjust the cell-level uplink power parameter, the base station adjusts the cell-level uplink power parameter, and sends an adjusted cell-level uplink power parameter to UE within the coverage area of the cell, so that the UE within the coverage area of the cell sends an uplink signal according to the adjusted cell-level uplink power parameter.

Specifically, the base station determines, according to the first quantity of accesses and the second quantity of accesses, whether to adjust the cell-level uplink power parameter; if determining to adjust the cell-level uplink power parameter, adjusts the cell-level uplink power parameter, and sends the adjusted cell-level uplink power parameter to the UE within the coverage area of the cell, so that the UE within the coverage area of the cell sends the uplink signal according to the adjusted cell-level uplink power parameter.

According to the uplink power control method provided in this embodiment, it is determined, according to a first quantity of accesses and a second quantity of accesses, whether to adjust a cell-level uplink power parameter; if it is determined to adjust the cell-level uplink power parameter, the cell-level uplink power parameter is adjusted, and an adjusted cell-level uplink power parameter is sent to UE within a coverage area of a cell, so that the UE within the coverage area of the cell sends an uplink signal according to the adjusted cell-level uplink power parameter. Therefore, a resource waste problem in the prior art caused by continuously measuring signal transmission power of UE to adjust a cell-level uplink power parameter is resolved, thereby saving a measurement resource.

Figure 2:
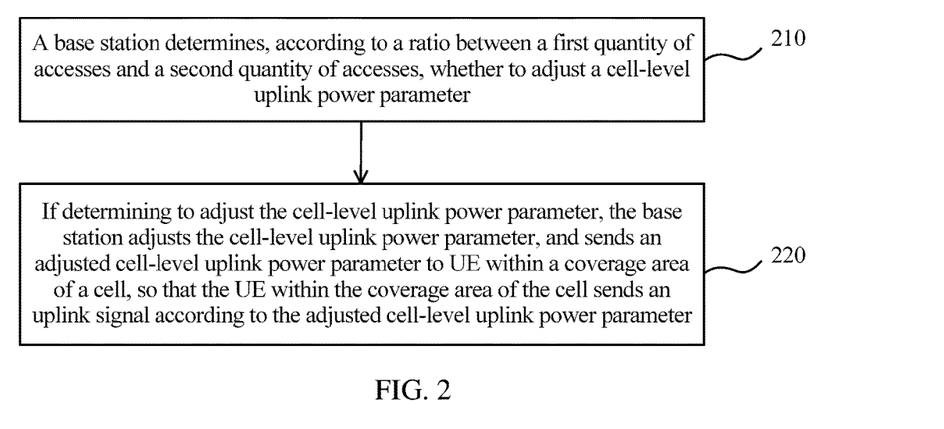
FIG. 2 is a flowchart of an uplink power control method according to Embodiment 2 of the present invention.

FIG. 2 is a flowchart of an uplink power control method according to Embodiment 2 of the present invention. Referring to FIG. 2, the method in this embodiment may include:

210. A base station determines, according to a ratio between a first quantity of accesses and a second quantity of accesses, whether to adjust a cell-level uplink power parameter.

For example, the determining, according to a ratio between a first quantity of accesses and a second quantity of accesses, whether to adjust a cell-level uplink power parameter may be implemented in the following manner:

The base station calculates the ratio x according to the first quantity a of accesses and the second quantity b of accesses, where $$x = \frac{a}{a+b},$$

and determines to adjust the cell-level uplink power parameter if the ratio x is greater than or equal to a preset first threshold.

If a value of x is relatively large, it means that most UEs within a coverage area of a cell access the cell by sending a random access preamble for one time, and it may be determined that a set cell-level uplink power parameter is relatively large. That is, whether the cell-level uplink power parameter is large or small may be determined according to the value of the ratio x, so as to determine whether to adjust the cell-level uplink power parameter.

220. If determining to adjust the cell-level uplink power parameter, the base station adjusts the cell-level uplink power parameter, and sends an adjusted cell-level uplink power parameter to UE within a coverage area of a cell, so that the UE within the coverage area of the cell sends an uplink signal according to the adjusted cell-level uplink power parameter.

For example, the adjusting the cell-level uplink power parameter may be implemented in the following manner:

For example, when the ratio x is greater than or equal to the preset first threshold, the value of the cell-level uplink power parameter is decreased to implement adjustment of the cell-level uplink power parameter. Decreasing the value of the cell-level uplink power parameter may be that the value of the cell-level uplink power parameter is decreased by a preset first adjustment step.

It should be noted that, if it is determined that the set cell-level uplink power parameter is relatively large, the value of the cell-level uplink power parameter may be decreased by the preset first adjustment step, where the first adjustment step may be set according to demodulation performance and interference that are of difference channels; for example, the first adjustment step is set to 1 dbm or 2 dbm. Inter-cell interference is reduced by adjusting the value of the cell-level uplink power parameter. For example, when the ratio x is greater than or equal to the preset first threshold, where the first threshold is set to 90%, the value of the cell-level uplink power parameter is decreased. If a current value of the cell-level uplink power parameter, for example, p0-NominalPUCCH, is −105 dbm, and a set first adjustment step is 2 dbm, an adjusted value of p0-NominalPUCCH is −107 dbm.

According to the uplink power control method provided in this embodiment, it is determined, according to a ratio between a first quantity of accesses and a second quantity of accesses, whether to adjust a cell-level uplink power parameter, and when the ratio is greater than or equal to a preset first threshold, the cell-level uplink power parameter is adjusted by decreasing a value of the cell-level uplink power parameter. Therefore, a resource waste problem in the prior art caused by continuously measuring signal transmission power of UE to adjust a cell-level uplink power parameter is resolved, thereby saving a measurement resource.

Referring to FIG. 2, a flowchart of an uplink power control method provided in this embodiment is the same as FIG. 2. In this embodiment, the determining, according to a ratio between a first quantity of accesses and a second quantity of accesses, whether to adjust a cell-level uplink power parameter may be implemented in the following manner:

The base station calculates the ratio y according to the first quantity a of accesses and the second quantity b of accesses, where $$y = \frac{b}{a+b},$$

and determines to adjust the cell-level uplink power parameter if the ratio y is greater than or equal to a preset second threshold.

In this embodiment, If a value of the ratio y is relatively large, it means that most UEs within a coverage area of a cell access the cell by sending a random access preamble for at least two times, and it may be determined that a set cell-level uplink power parameter is relatively small. That is, whether the cell-level uplink power parameter is large or small may be determined according to the value of the ratio y, so as to determine whether to adjust the cell-level uplink power parameter.

In this embodiment, if determining to adjust the cell-level uplink power parameter, the base station adjusts the cell-level uplink power parameter, and sends an adjusted cell-level uplink power parameter to UE within the coverage area of the cell, so that the UE within the coverage area of the cell sends an uplink signal according to the adjusted cell-level uplink power parameter. The adjusting the cell-level uplink power parameter may be implemented in the following manner:

For example, when the ratio y is greater than or equal to the preset second threshold, the base station increases the value of the cell-level uplink power parameter to implement adjustment of the cell-level uplink power parameter. That the base station increases the value of the cell-level uplink power parameter may be that the base station increases the value of the cell-level uplink power parameter by a preset second adjustment step.

It should be noted that, if it is determined that the set cell-level uplink power parameter is relatively small, the value of the cell-level uplink power parameter may be increased by the preset second adjustment step, where the second adjustment step may be set according to demodulation performance and interference that are of difference channels; for example, the second adjustment step is set to 1 dbm or 2 dbm. Uplink demodulation performance of the UE is enhanced by increasing the value of the cell-level uplink power parameter. For example, when the ratio y is greater than or equal to the preset second threshold, for example, the second threshold is 40%, the value of the cell-level uplink power parameter is increased. If a current value of the cell-level uplink power parameter, for example, "p0-NominalPUCCH", is −105 dbm, and a set second adjustment step is 1 dbm, an adjusted value of "p0-NominalPUCCH" is −104 dbm.

According to the uplink power control method provided in this embodiment, a base station determines, according to a ratio between a first quantity of accesses and a second quantity of accesses, whether to adjust a cell-level uplink power parameter, and when the ratio is greater than or equal to a preset second threshold, adjusts the cell-level uplink power parameter by increasing a value of the cell-level uplink power parameter. Therefore, a resource waste problem in the prior art caused by continuously measuring signal transmission power of UE to adjust a cell-level uplink power parameter is resolved, thereby saving a measurement resource.

Figure 3:
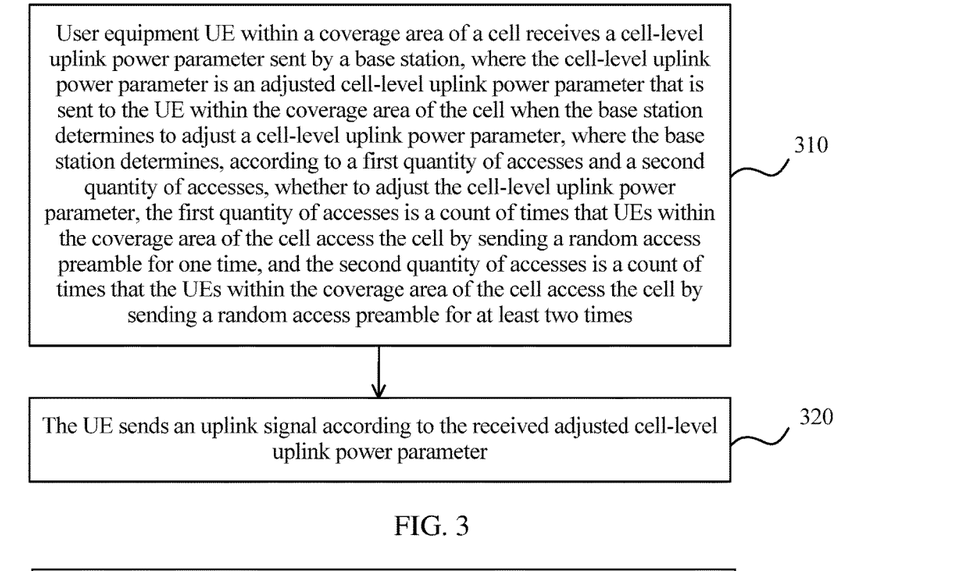
FIG. 3 is a flowchart of an uplink power control method according to Embodiment 3 of the present invention.

FIG. 3 is a flowchart of an uplink power control method according to Embodiment 3 of the present invention. The method in this embodiment includes the following steps:

310. User equipment (UE) within a coverage area of a cell receives a cell-level uplink power parameter sent by a base station, where the cell-level uplink power parameter is an adjusted cell-level uplink power parameter that is sent to the UE within the coverage area of the cell when the base station determines to adjust a cell-level uplink power parameter, where the base station determines, according to a first quantity of accesses and a second quantity of accesses, whether to adjust the cell-level uplink power parameter, the first quantity of accesses is a count of times that UEs within the coverage area of the cell access the cell by sending a random access preamble for one time, and the second quantity of accesses is a count of times that the UEs within the coverage area of the cell access the cell by sending a random access preamble for at least two times.

320. The UE sends an uplink signal according to the received adjusted cell-level uplink power parameter.

That the UE sends an uplink signal according to a value of the received adjusted cell-level uplink power parameter may be implemented in the following manner: The UE uses the value of the received adjusted cell-level uplink power parameter as power for sending the uplink signal, and sends the uplink signal at the power.

According to the uplink power control method provided in this embodiment, UE receives an adjusted cell-level uplink power parameter sent by a base station, and sends an uplink signal according to the received adjusted cell-level uplink power parameter. Therefore, a resource waste problem in the prior art caused by continuously measuring signal transmission power of UE to adjust a cell-level uplink power parameter is resolved, thereby saving a measurement resource.

Figure 4:
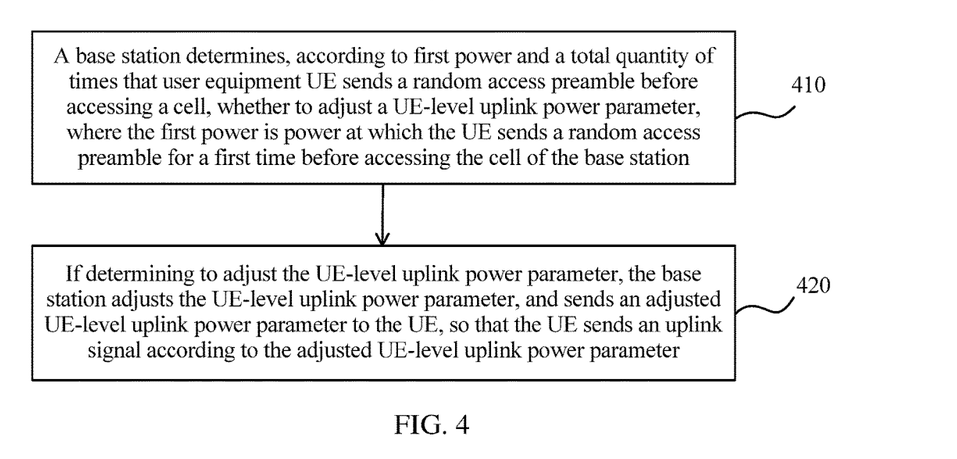
FIG. 4 is a flowchart of an uplink power control method according to Embodiment 4 of the present invention.

FIG. 4 is a flowchart of an uplink power control method according to Embodiment 4 of the present invention. The method in this embodiment includes the following steps:

410. A base station determines, according to first power and a total quantity of times that user equipment (UE) sends a random access preamble before accessing a cell, whether to adjust a UE-level uplink power parameter, where the first power is power at which the UE sends a random access preamble for the first time before accessing the cell of the base station.

Because the first power and the total quantity of times that the UE sends the random access preamble before accessing the cell are data reported to the base station by the UE after accessing the cell, the base station does not need to wait for the UE to report a signal to interference plus noise ratio, and determines, according to the first power and the total quantity of times that the user equipment (UE) sends the random access preamble before accessing the cell, whether to adjust the UE-level uplink power parameter. Therefore, a measurement resource is saved. In addition, adjustment can be performed on the uplink power parameter after the UE accesses the cell, and therefore, real-time adjustment can be performed on the UE-level uplink power parameter.

420. If determining to adjust the UE-level uplink power parameter, the base station adjusts the UE-level uplink power parameter, and sends an adjusted UE-level uplink power parameter to the UE, so that the UE sends an uplink signal according to the adjusted UE-level uplink power parameter.

Specifically, the base station determines, according to the first power and the total quantity of times that the user equipment (UE) sends the random access preamble before accessing the cell, whether to adjust the UE-level uplink power parameter; if determining to adjust the UE-level uplink power parameter, the base station adjusts the UE-level uplink power parameter, and sends the adjusted UE-level uplink power parameter to the UE, so that the UE sends the uplink signal according to the adjusted UE-level uplink power parameter.

According to the uplink power control method provided in this embodiment, a base station determines, according to first power and a total quantity of times that user equipment (UE) sends a random access preamble before accessing a cell, whether to adjust a UE-level uplink power parameter; if determining to adjust the UE-level uplink power parameter, the base station adjusts the UE-level uplink power parameter, and sends an adjusted UE-level uplink power parameter to the UE, so that the UE sends an uplink signal according to the adjusted UE-level uplink power parameter. Therefore, a resource waste problem in the prior art caused by continuously measuring signal transmission power of UE to adjust a cell-level uplink power parameter is resolved, thereby saving a measurement resource, and implementing real-time adjustment of a UE-level uplink power parameter.

Figure 5:
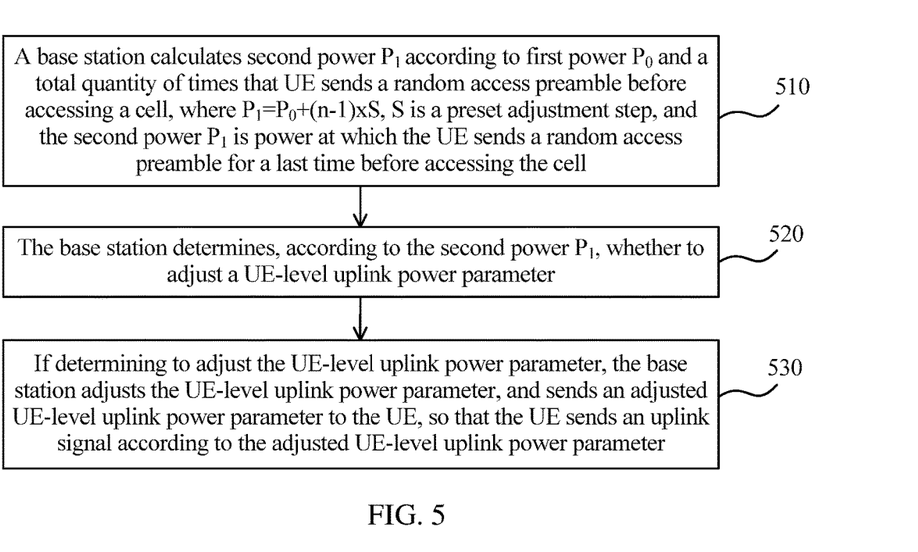
FIG. 5 is a flowchart of an uplink power control method according to Embodiment 5 of the present invention.

FIG. 5 is a flowchart of an uplink power control method according to Embodiment 5 of the present invention. The method in this embodiment includes the following steps:

510. A base station calculates second power $P_1$ according to first power $P_0$ and a total quantity of times n that UE sends a random access preamble before accessing a cell, where $P_1=P_0+(n-1)\times S$, S is a preset adjustment step, and the second power $P_1$ is power at which the UE sends a random access preamble for the last time before accessing the cell.

Because a UE information request message and a UE information response message are introduced in Release 9 of an LTE protocol 36.331, after a radio resource control connection of UE is successfully established, an eNodeB sends the UE information request message to request the UE to report random access process information, and the UE feeds back, in the UE information response message, a total quantity of times that the UE sends a random access preamble before successfully accessing a cell last time. In this embodiment, to resolve a measurement resource waste problem in the prior art caused by uplink power control that relies on measured data, uplink transmission power that is suitable for the UE is estimated by using a quantity of times of sending the preamble and power at which a random access preamble is sent for the first time, and whether to adjust a UE-level uplink power parameter is further determined. Therefore, uplink power control is implemented without relying on the measured data, thereby saving a measurement resource.

520. The base station determines, according to the second power $P_1$, whether to adjust a UE-level uplink power parameter.

If the second power $P_1$ is not equal to a cell-level uplink power parameter $P_{cell}$, the base station determines to adjust the UE-level uplink power parameter.

530. If determining to adjust the UE-level uplink power parameter, the base station adjusts the UE-level uplink power parameter, and sends an adjusted UE-level uplink power parameter to the UE, so that the UE sends an uplink signal according to the adjusted UE-level uplink power parameter.

For example, that the base station adjusts the UE-level uplink power parameter may be implemented by using the following manner: The base station adjusts a value $P_{ue}$ of the UE-level uplink power parameter to $P_{ue}'$, where $P_{ue}'=P_1-P_{cell}$.

Steps 510 to 530 are described herein with reference to an instance. For example, the first power $P_0$ is −104 dbm; if UE successfully accesses the cell by sending a random access preamble for three times, and a set power ramp step, that is, a preset adjustment step, of the random access preamble is 2 dbm, power of the UE when sending a random access preamble for the second time is −102 dbm, and power of the UE when sending a random access preamble for the third time is −100 dbm. Therefore, the UE accesses the cell at power of −104+2×(3−1)=−100 dbm, and a UE-level power control parameter, for example "p0-UE-PUCCH" or "p0-UE-PUSCH", may be accordingly adjusted. Because methods for adjusting "p0-UE-PUCCH" and "p0-UE-PUSCH" are the same, only "p0-UE-PUCCH" is used herein as an example for description. It is assumed that a current value of a cell-level uplink power parameter "p0-NominalPUCCH" is −105 dbm, and, currently, power that is relatively suitable for the UE and is determined according to the quantity of times that the UE sends the random access preamble and the first power $P_0$ is −100 dbm. Then, the UE-level power parameter "p0-UE-PUCCH" needs to be adjusted to (−100)−(−105)=5 to adapt to current power of a physical uplink control channel, the UE-level power parameter may be adjusted without waiting for the UE to report a signal to interference plus noise ratio, and an adjusted UE-level power parameter "p0-UE-PUCCH" is delivered to the UE by using a radio resource control reconfiguration message.

According to the uplink power control method provided in this embodiment, a base station calculates second power $P_1$ according to first power $P_0$ and a total quantity of times n that UE sends a random access preamble before accessing a cell, and the base station determines, according to the second power $P_1$, whether to adjust a UE-level uplink power parameter. If determining to adjust the UE-level uplink power parameter, the base station adjusts the UE-level uplink power parameter, and sends an adjusted UE-level uplink power parameter to the UE, so that the UE sends an uplink signal according to the adjusted UE-level uplink power parameter. Therefore, a resource waste problem in the prior art caused by continuously measuring signal transmission power of UE to adjust a cell-level uplink power parameter is resolved, thereby saving a measurement resource, and implementing real-time adjustment of a UE-level uplink power parameter.

Figure 6:
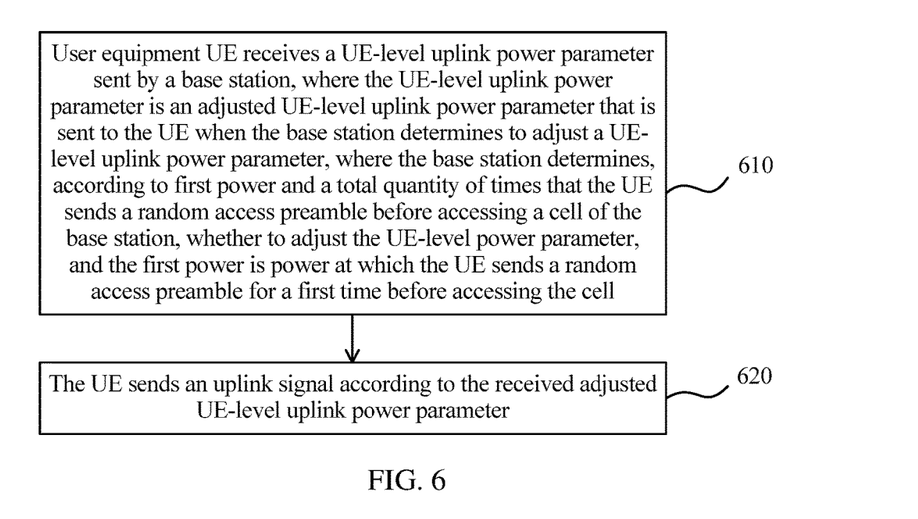
FIG. 6 is a flowchart of an uplink power control method according to Embodiment 6 of the present invention.

FIG. 6 is a flowchart of an uplink power control method according to Embodiment 6 of the present invention. The method in this embodiment includes the following steps:

610. User equipment (UE) receives a UE-level uplink power parameter sent by a base station, where the UE-level uplink power parameter is an adjusted UE-level uplink power parameter that is sent to the UE when the base station determines to adjust a UE-level uplink power parameter, where the base station determines, according to first power and a total quantity of times that the UE sends a random access preamble before accessing a cell of the base station, whether to adjust the UE-level power parameter, and the first power is power at which the UE sends a random access preamble for the first time before accessing the cell.

620. The UE sends an uplink signal according to the received adjusted UE-level uplink power parameter.

That the UE sends an uplink signal according to a value of the received adjusted UE-level uplink power parameter may be implemented in the following manner: The UE uses a sum of the value of the received adjusted UE-level uplink power parameter and a value of a received cell-level uplink power parameter, as power for sending the uplink signal, and sends the uplink signal at the power.

It should be noted that, because a cell-level uplink power parameter is sent to the UE by using a system information block (SIB) 2, after receiving the cell-level uplink power parameter sent by using the SIB2, the UE may use the sum of the received adjusted UE-level uplink power parameter and the received cell-level uplink power parameter, as target power for sending the uplink signal, and sends the uplink signal at the power.

According to the uplink power control method provided in this embodiment, UE receives an adjusted UE-level uplink power parameter sent by a base station, and sends an uplink signal according to the received adjusted UE-level uplink power parameter. Therefore, a resource waste problem in the prior art caused by that a base station adjusts a cell-level uplink power parameter according to a measurement result is resolved, thereby saving a measurement resource.

Figure 7:
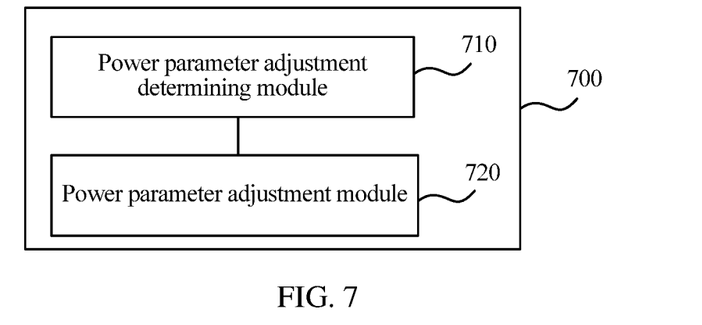
FIG. 7 is a schematic structural diagram of an uplink power control apparatus 700 according to Embodiment 7 of the present invention.

FIG. 7 is a schematic structural diagram of an uplink power control apparatus 700 according to Embodiment 7 of the present invention. The apparatus in this embodiment is applicable to a case in which uplink power control is performed on UE within a coverage area of a cell. The apparatus is generally implemented in a manner of hardware and/or software. Referring to FIG. 7, the apparatus includes the following modules: a power parameter adjustment determining module 710 and a power parameter adjustment module 720.

The power parameter adjustment determining module 710 is configured to determine, according to a first quantity of accesses and a second quantity of accesses, whether a cell-level uplink power parameter is to be adjusted, where the first quantity of accesses is a count of times that user equipments (UEs) within a coverage area of a cell of a base station access the cell by sending a random access preamble for one time, and the second quantity of accesses is a count of times that the UEs within the coverage area of the cell access the cell by sending a random access preamble for at least two times; and the power parameter adjustment module 720 is configured to: if it is determined to adjust the cell-level uplink power parameter, adjust the cell-level uplink power parameter, and send an adjusted cell-level uplink power parameter to UE within the coverage area of the cell, so that the UE within the coverage area of the cell sends an uplink signal according to the adjusted cell-level uplink power parameter.

Further, the power parameter adjustment determining module 710 is specifically configured to determine, according to a ratio between the first quantity of accesses and the second quantity of accesses, whether the cell-level uplink power parameter is to be adjusted.

Further, the power parameter adjustment determining module 710 is specifically configured to: calculate the ratio x according to the first quantity a of accesses and the second quantity b of accesses, where $$x = \frac{a}{a+b},$$

and if the ratio x is greater than or equal to a preset first threshold, determine that the cell-level uplink power parameter is to be adjusted; and the power parameter adjustment module 720 is specifically configured to decrease a value of the cell-level uplink power parameter.

Further, the power parameter adjustment module 720 is specifically configured to decrease the value of the cell-level uplink power parameter by a preset first adjustment step.

Further, the power parameter adjustment determining module 710 is specifically configured to: calculate the ratio y according to the first quantity a of accesses and the second quantity b of accesses, where $$y = \frac{b}{a+b},$$

and if the ratio y is greater than or equal to a preset second threshold, determine that the cell-level uplink power parameter is to be adjusted; and the power parameter adjustment module 720 is further specifically configured to increase a value of the cell-level uplink power parameter.

Further, the power parameter adjustment module 720 is specifically configured to increase the value of the cell-level uplink power parameter by a preset second adjustment step.

According to the uplink power control apparatus provided in this embodiment, it is determined, according to a first quantity of accesses and a second quantity of accesses, whether to adjust a cell-level uplink power parameter; if it is determined to adjust the cell-level uplink power parameter, the cell-level uplink power parameter is adjusted, and an adjusted cell-level uplink power parameter is sent to UE within a coverage area of a cell, so that the UE within the coverage area of the cell sends an uplink signal according to the adjusted cell-level uplink power parameter. Therefore, a resource waste problem in the prior art caused by continuously measuring signal transmission power of UE to adjust a cell-level uplink power parameter is resolved, thereby saving a measurement resource.

Figure 8:
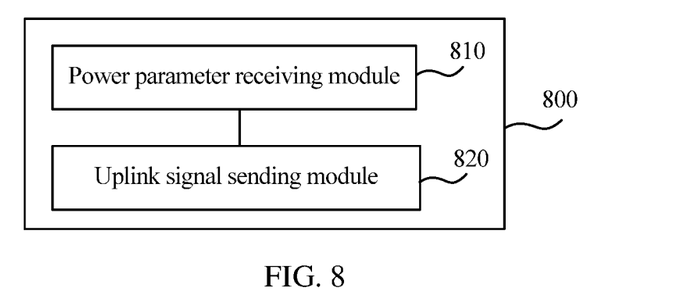
FIG. 8 is a schematic structural diagram of an uplink power control apparatus 800 according to Embodiment 8 of the present invention.

FIG. 8 is a schematic structural diagram of an uplink power control apparatus 800 according to Embodiment 8 of the present invention. Referring to FIG. 8, the apparatus includes the following modules: a power parameter receiving module 810 and an uplink signal sending module 820.

The power parameter receiving module 810 is configured to receive a cell-level uplink power parameter sent by a base station, where the cell-level uplink power parameter is an adjusted cell-level uplink power parameter that is sent to UE within a coverage area of a cell when the base station determines to adjust a cell-level uplink power parameter, where the base station determines, according to a first quantity of accesses and a second quantity of accesses, whether to adjust the cell-level uplink power parameter, the first quantity of accesses is a count of times that UEs within the coverage area of the cell of the base station access the cell by sending a random access preamble for one time, and the second quantity of accesses is a count of times that the UEs within the coverage area of the cell access the cell by sending a random access preamble for at least two times; and the uplink signal sending module 820 is configured to send an uplink signal according to the received adjusted cell-level uplink power parameter.

Further, the uplink signal sending module 820 is specifically configured to: use the received adjusted cell-level uplink power parameter as power for sending the uplink signal, and send the uplink signal at the power.

According to the uplink power control apparatus provided in this embodiment, an adjusted UE-level uplink power parameter sent by a base station is received, and an uplink signal is sent according to the received adjusted cell-level uplink power parameter. Therefore, a resource waste problem in the prior art caused by that a base station adjusts a cell-level uplink power parameter according to a measurement result is resolved, thereby saving a measurement resource.

Referring to FIG. 7, a schematic structural diagram of an uplink power control apparatus provided in this embodiment is the same as FIG. 7. In this embodiment, the power parameter adjustment determining module is configured to determine, according to first power and a total quantity of times that user equipment (UE) sends a random access preamble before accessing a cell, whether a UE-level uplink power parameter is to be adjusted, where the first power is power at which the UE sends a random access preamble for the first time before accessing the cell of a base station; and the power parameter adjustment module is configured to: if it is determined to adjust the UE-level uplink power parameter, adjust the UE-level uplink power parameter, and send an adjusted UE-level uplink power parameter to the UE, so that the UE sends an uplink signal according to the adjusted UE-level uplink power parameter.

Further, the power parameter adjustment determining module is specifically configured to: calculate second power $P_1$ according to the first power $P_0$ and the total quantity of times n that the UE sends the random access preamble before accessing the cell, where $P_1 = P_0 + (n-1) \times S$, S is a preset adjustment step, and the second power $P_1$ is power at which the UE sends a random access preamble for the last time before accessing the cell; and determine, according to the second power $P_1$, whether the UE-level uplink power parameter is to be adjusted.

Further, the power parameter adjustment determining module is specifically configured to: if the second power $P_1$ is not equal to a cell-level uplink power parameter $P_{cell}$, determine, by the base station, that the UE-level uplink power parameter is to be adjusted; and the power parameter adjustment module is specifically configured to adjust a value $P_{ue}$ of the UE-level uplink power parameter to $P_{ue}'$, where $P_{ue}' = P_1 - P_{cell}$.

According to the uplink power control apparatus provided in this embodiment, it is determined, according to first power and a total quantity of times that user equipment (UE) sends a random access preamble before accessing a cell, whether to adjust a UE-level uplink power parameter; if it is determined to adjust the UE-level uplink power parameter, the UE-level uplink power parameter is adjusted, and an adjusted UE-level uplink power parameter is sent to the UE, so that the UE sends an uplink signal according to the adjusted UE-level uplink power parameter. Therefore, a resource waste problem in the prior art caused by continuously measuring signal transmission power of UE to adjust a cell-level uplink power parameter is resolved, thereby saving a measurement resource, and implementing real-time adjustment of a UE-level uplink power parameter.

Referring to FIG. 8, a schematic structural diagram of an uplink power control apparatus provided in this embodiment is the same as FIG. 8. In this embodiment, the power parameter receiving module is configured to receive a UE-level uplink power parameter sent by a base station, where the UE-level uplink power parameter is an adjusted UE-level uplink power parameter that is sent to the UE when the base station determines to adjust a UE-level uplink power parameter, where the base station determines, according to first power and a total quantity of times that user equipment (UE) sends a random access preamble before accessing a cell of the base station, whether to adjust the UE-level power parameter, and the first power is power at which the UE sends a random access preamble for the first time before accessing the cell; and the uplink signal sending module is configured to send an uplink signal according to the received adjusted UE-level uplink power parameter.

Further, the uplink signal sending module is specifically configured to: use a sum of the received adjusted UE-level uplink power parameter and a received cell-level uplink power parameter, as power for sending the uplink signal, and send the uplink signal at the power.

According to the uplink power control apparatus provided in this embodiment, an adjusted UE-level uplink power parameter sent by a base station is received, and an uplink signal is sent according to the received adjusted cell-level uplink power parameter. Therefore, a resource waste problem in the prior art caused by that a base station adjusts a cell-level uplink power parameter according to a measurement result is resolved, thereby saving a measurement resource, and implementing real-time adjustment of a UE-level uplink power parameter.

Figure 9:
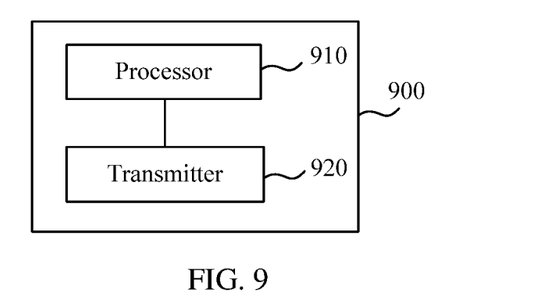
FIG. 9 is a schematic structural diagram of an uplink power control apparatus 900 according to Embodiment 9 of the present invention.

FIG. 9 is a schematic structural diagram of an uplink power control apparatus 900 according to Embodiment 9 of the present invention. Referring to FIG. 9, the apparatus includes a processor 910 and a transmitter 920.

The processor 910 is configured to determine, according to a first quantity of accesses and a second quantity of accesses, whether a cell-level uplink power parameter is to be adjusted, where the first quantity of accesses is a count of times that user equipments (UEs) within a coverage area of a cell of a base station access the cell by sending a random access preamble for one time, and the second quantity of accesses is a count of times that the UEs within the coverage area of the cell access the cell by sending a random access preamble for at least two times; and the transmitter 920 is configured to: if it is determined to adjust the cell-level uplink power parameter, adjust the cell-level uplink power parameter, and send an adjusted cell-level uplink power parameter to UE within the coverage area of the cell, so that the UE within the coverage area of the cell sends an uplink signal according to the adjusted cell-level uplink power parameter.

Further, the processor 910 is specifically configured to determine, according to a ratio between the first quantity of accesses and the second quantity of accesses, whether the cell-level uplink power parameter is to be adjusted.

Further, the processor 910 is specifically configured to: calculate the ratio x between the first quantity a of accesses and the second quantity b of accesses, where $$x = \frac{a}{a+b},$$

and if the ratio x is greater than or equal to a preset first threshold, determine that the cell-level uplink power parameter is to be adjusted; and the transmitter 920 is specifically configured to decrease a value of the cell-level uplink power parameter.

Further, the transmitter 920 is specifically configured to decrease the value of the cell-level uplink power parameter by a preset first adjustment step.

Further, the processor 910 is specifically configured to: calculate the ratio y between the first quantity a of accesses and the second quantity b of accesses, where $$y = \frac{b}{a+b},$$

and if the ratio y is greater than or equal to a preset second threshold, determine that the cell-level uplink power parameter is to be adjusted; and the transmitter 920 is specifically configured to increase a value of the cell-level uplink power parameter.

Further, the transmitter 920 is specifically configured to increase the value of the cell-level uplink power parameter by a preset second adjustment step.

According to the uplink power control apparatus provided in this embodiment, it is determined, according to a first quantity of accesses and a second quantity of accesses, whether to adjust a cell-level uplink power parameter; if it is determined to adjust the cell-level uplink power parameter, the cell-level uplink power parameter is adjusted, and an adjusted cell-level uplink power parameter is sent to UE within a coverage area of a cell, so that the UE within the coverage area of the cell sends an uplink signal according to the adjusted cell-level uplink power parameter. Therefore, a resource waste problem in the prior art caused by continuously measuring signal transmission power of UE to adjust a cell-level uplink power parameter is resolved, thereby saving a measurement resource.

Figure 10:
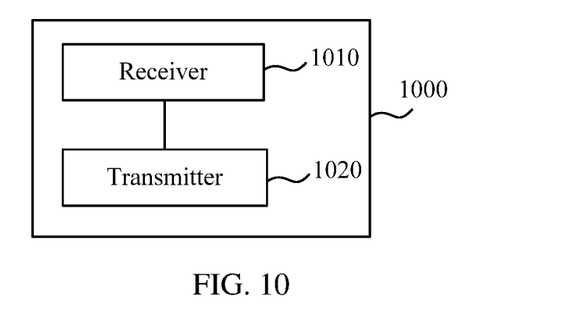
FIG. 10 is a schematic structural diagram of an uplink power control apparatus 1000 according to Embodiment 10 of the present invention.

FIG. 10 is a schematic structural diagram of an uplink power control apparatus 1000 according to Embodiment 10 of the present invention. Referring to FIG. 10, the apparatus includes a receiver 1010 and a transmitter 1020.

The receiver 1010 is configured to receive a cell-level uplink power parameter sent by a base station, where the cell-level uplink power parameter is an adjusted cell-level uplink power parameter that is sent to UE within a coverage area of a cell when the base station determines to adjust a cell-level uplink power parameter, where the base station determines, according to a first quantity of accesses and a second quantity of accesses, whether to adjust the cell-level uplink power parameter, the first quantity of accesses is a count of times that UEs within the coverage area of the cell of the base station access the cell by sending a random access preamble for one time, and the second quantity of accesses is a count of times that the UEs within the coverage area of the cell access the cell by sending a random access preamble for at least two times; and the transmitter 1020 is configured to send an uplink signal according to the received adjusted cell-level uplink power parameter.

Further, the transmitter 1020 is specifically configured to: use the received adjusted cell-level uplink power parameter as power for sending the uplink signal, and send the uplink signal at the power.

According to the uplink power control apparatus provided in this embodiment, an adjusted UE-level uplink power parameter sent by a base station is received, and an uplink signal is sent according to the received adjusted cell-level uplink power parameter. Therefore, a resource waste problem in the prior art caused by that a base station adjusts a cell-level uplink power parameter according to a measurement result is resolved, thereby saving a measurement resource.

Referring to FIG. 9, a schematic structural diagram of an uplink power control apparatus provided in this embodiment is the same as FIG. 9. In this embodiment, the processor is configured to determine, according to first power and a total quantity of times that user equipment (UE) sends a random access preamble before accessing a cell, whether a UE-level uplink power parameter is to be adjusted, where the first power is power at which the UE sends a random access preamble for the first time before accessing the cell of a base station; and the transmitter is configured to: if it is determined to adjust the UE-level uplink power parameter, adjust the UE-level uplink power parameter, and send an adjusted UE-level uplink power parameter to the UE, so that the UE sends an uplink signal according to the adjusted UE-level uplink power parameter.

Further, the processor is specifically configured to: calculate second power $P_1$ according to the first power $P_0$ and the total quantity of times n that the UE sends the random access preamble before accessing the cell, where $P_1=P_0+(n-1)\times S$, S is a preset adjustment step, and the second power $P_1$ is power at which the UE sends a random access preamble for the last time before accessing the cell; and determine, according to the second power $P_1$, whether the UE-level uplink power parameter is to be adjusted.

Further, the processor is specifically configured to: if the second power $P_1$ is not equal to a cell-level uplink power parameter $P_{cell}$, determine, by the base station, that the UE-level uplink power parameter is to be adjusted; and the transmitter is specifically configured to adjust a value $P_{ue}$ of the UE-level uplink power parameter to $P_{ue}'$, where $P_{ue}'=P_1-P_{cell}$.

According to the uplink power control apparatus provided in this embodiment, it is determined, according to first power and a total quantity of times that user equipment (UE) sends a random access preamble before accessing a cell, whether to adjust a UE-level uplink power parameter; if it is determined to adjust the UE-level uplink power parameter, the UE-level uplink power parameter is adjusted, and an adjusted UE-level uplink power parameter is sent to the UE, so that the UE sends an uplink signal according to the adjusted UE-level uplink power parameter. Therefore, a resource waste problem in the prior art caused by continuously measuring signal transmission power of UE to adjust a cell-level uplink power parameter is resolved, thereby saving a measurement resource, and implementing real-time adjustment of a UE-level uplink power parameter.

Referring to FIG. 10, a schematic structural diagram of an uplink power control apparatus provided in this embodiment is the same as FIG. 10. In this embodiment, the receiver is configured to receive a UE-level uplink power parameter sent by a base station, where the UE-level uplink power parameter is an adjusted UE-level uplink power parameter that is sent to the UE when the base station determines to adjust a UE-level uplink power parameter, where the base station determines, according to first power and a total quantity of times that user equipment (UE) sends a random access preamble before accessing a cell of the base station, whether to adjust the UE-level power parameter, and the first power is power at which the UE sends a random access preamble for the first time before accessing the cell; and the transmitter is configured to send an uplink signal according to the received adjusted UE-level uplink power parameter.

Further, the transmitter is specifically configured to: use a sum of the received adjusted UE-level uplink power parameter and a received cell-level uplink power parameter, as power for sending the uplink signal at the power.

According to the uplink power control apparatus provided in this embodiment, an adjusted UE-level uplink power parameter sent by a base station is received, and an uplink signal is sent according to the received adjusted cell-level uplink power parameter. Therefore, a resource waste problem in the prior art caused by that a base station adjusts a cell-level uplink power parameter according to a measurement result is resolved, thereby saving a measurement resource, and implementing real-time adjustment of a UE-level uplink power parameter.

Persons of ordinary skill in the art may understand that all or some of the steps of the method embodiments may be implemented by a program instructing relevant hardware. The foregoing program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An uplink power control method, comprising:
   determining, by a base station according to a first quantity a of accesses and a second quantity b of accesses, whether to adjust a cell-level uplink power parameter, wherein the first quantity a of accesses is a count of times that first user equipments (UEs) of a plurality of UEs within a coverage area of a cell of the base station send a random access preamble for one time before accessing the cell, and wherein the second quantity b of accesses is a count of times that second UEs of the plurality of UEs within the coverage area of the cell send a random access preamble for at least two times before accessing the cell, wherein the determining whether to adjust the cell-level uplink power parameter comprises determining, by the base station according to a ratio x between the first quantity a of accesses and the second quantity b of accesses, whether to adjust the cell-level uplink power parameter by:
   calculating, by the base station, the ratio x according to the first quantity a of accesses and the second quantity b of accesses, wherein $$x = \frac{a}{a+b},$$

and wherein a and b are each positive integers; and
   determining, by the base station when the ratio x is greater than or equal to a preset first threshold, to adjust the cell-level uplink power parameter;

adjusting, by the base station when determining to adjust the cell-level uplink power parameter, the cell-level uplink power parameter by decreasing, by the base station, a value of the cell-level uplink power parameter; and sending, by the base station, an adjusted cell-level uplink power parameter to at least one of the UEs within the coverage area of the cell.

2. The method according to claim 1, wherein the decreasing the value of the cell-level uplink power parameter comprises:

decreasing, by the base station, the value of the cell-level uplink power parameter by a preset first adjustment step.

3. An uplink power control apparatus, located in a base station, comprising:

a processor; and a non-transitory computer readable storage medium, wherein the non-transitory computer readable storage medium stores a program to be executed by the processor, the program including instructions for:

determining, according to a first quantity a of accesses and a second quantity b of accesses, whether a cell-level uplink power parameter is to be adjusted, wherein the first quantity a of accesses is a count of times that first user equipments (UEs) of a plurality of UEs within a coverage area of a cell of the base station send a random access preamble for one time before accessing the cell, and wherein the second quantity b of accesses is a count of times that second UEs of the plurality of UEs within the coverage area of the cell send a random access preamble for at least two times before accessing the cell, wherein the instructions for determining whether to adjust the cell-level uplink power parameter include instructions for determining, according to a ratio x between the first quantity a of accesses and the second quantity b of accesses, whether to adjust the cell-level uplink power parameter, by:

calculating, by the base station, the ratio x according to the first quantity a of accesses and the second quantity b of accesses, wherein $$x = \frac{a}{a+b},$$

and wherein a and b are each positive integers; and determining, by the base station when the ratio x is greater than or equal to a preset first threshold, to adjust the cell-level uplink power parameter;

adjusting, when it is determined to adjust the cell-level uplink power parameter, the cell-level uplink power parameter by decreasing a value of the cell-level uplink power parameter; and sending an adjusted cell-level uplink power parameter to at least one of the UEs within the coverage area of the cell.

4. The apparatus according to claim 3, wherein the value of the cell-level uplink power parameter is decreased by a preset first adjustment step.

5. An uplink power control apparatus, located in a user equipment (UE), comprising:

a processor; and a non-transitory computer readable storage medium, wherein the non-transitory computer readable storage medium stores a program to be executed by the processor, the program including instructions for:

receiving an adjusted cell-level uplink power parameter sent by abase station, wherein the adjusted cell-level uplink power parameter is sent to the UE within a coverage area of a cell when the base station determines to adjust a cell-level uplink power parameter, and the base station determines, according to a first quantity a of accesses and a second quantity b of accesses, whether to adjust the cell-level uplink power parameter, wherein the first quantity a of accesses is a count of times that first UEs of UEs within the coverage area of the cell of the base station send a random access preamble for onetime before accessing the cell, and wherein the second quantity b of accesses is a count of times that second UEs of the UEs within the coverage area of the cell send a random access preamble for at least two times before accessing the cell, wherein the base station determines whether to adjust the cell-level uplink power parameter according to a ratio x between the first quantity a of accesses and the second quantity b of accesses, whether to adjust the cell-level uplink power parameter by calculating, by the base station, the ratio x according to the first quantity a of accesses and the second quantity b of accesses, wherein $$x = \frac{a}{a+b},$$

and wherein a and b are each positive integers, and further by determining, by the base station when the ratio x is greater than or equal to a preset first threshold, to adjust the cell-level uplink power parameter, and wherein the base station adjusts the cell-level uplink power parameter by decreasing a value of the cell-level uplink power parameter; and sending an uplink signal according to a value of the adjusted cell-level uplink power parameter.

6. The apparatus according to claim 5, wherein the value of the adjusted cell-level uplink power parameter is used as a power for sending the uplink signal.

* * * * *